Figure 1:
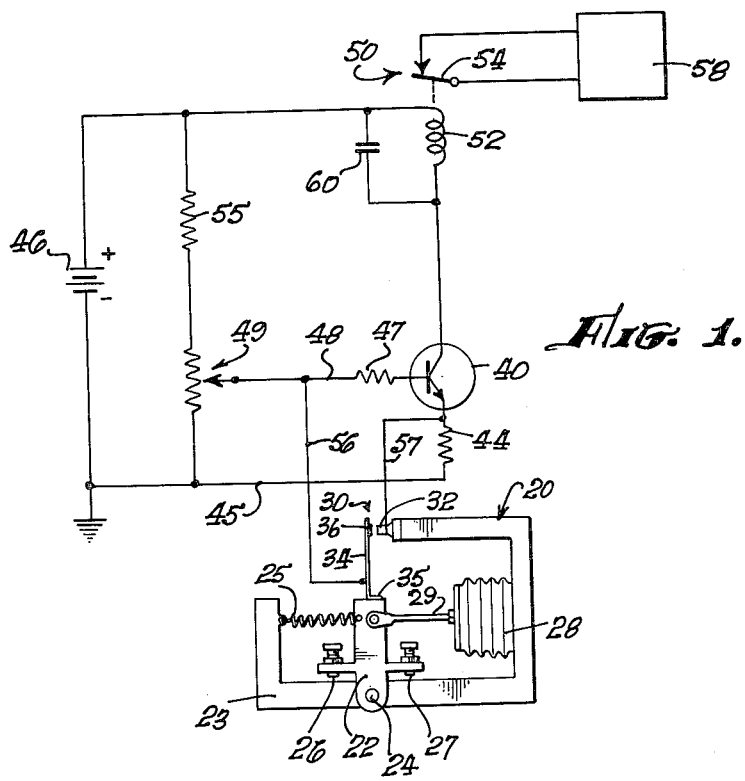

Aug. 7, 1962    S. CAREY    3,048,748

PROXIMITY SWITCH INTERPRETER

Filed Nov. 12, 1959

STUART CAREY,
INVENTOR.

BY Barlow + Lewis

United States Patent Office 3,048,748
Patented Aug. 7, 1962

3,048,748
PROXIMITY SWITCH INTERPRETER
Stuart Carey, Garden Grove, Calif., assignor to Giannini Controls Corporation, Pasadena, Calif., a corporation of New York
Filed Nov. 12, 1959, Ser. No. 852,433
3 Claims. (Cl. 317—157)

This invention has to do generally with measuring and control mechanisms in which the position of a movable member is sensed by an electrical switch.

The movable member may, for example, comprise the beam of a scale, the balance lever of a force ratio responsive device, or any computer output member that moves in a definite manner in response to a critical relationship of input variables which it is desired to sense. Whereas many types of tranducer are known to be capable of producing an electrical signal in response to such movement of a computer member, there are definite advantages of simplicity, reliability and the like in employing a simple switch which typically is open when the member is on one side of a critical position and is closed when the element is on the other side of that position. The switch may then be connected in any desired type of output circuit to produce a signal, operate a control mechanism or the like, depending upon the particular system in question. That output circuit often includes a relay, which provides increased power-handling capacity without overloading the primary switch contacts. Amplification by a vacuum tube or transistor amplifier may be employed for the same purpose.

Despite the theoretically simple and reliable action of an electrical switch, previously available mechanisms have been subject to serious practical disadvantages. A particularly serious problem results when the system is subject to impressed mechanical vibrations from its surroundings. That is especially true when the vibrations include a wide or variable range of frequencies. Under such conditions the switch contacts tend to chatter, so that the output signal is variable, intermittent and unreliable.

That difficulty may be somewhat reduced by mounting one or both of the switch contacts on a flexible resilient arm, so that switch closure does not produce any appreciable impulse force that may be transmitted back to the movable element to disturb its movement. Such spring-mounted contacts permit the switch to remain closed in the presence of vibration, provided the movable member has moved beyond the critical position sufficiently far. However, they do not prevent intermittent and erratic switch closure when the member is near, or even short of, the critical position.

The present invention avoids those difficulties, and provides a uniform and reliable output signal. Not only is that signal free of intermittent or other erratic effects in the presence of normal mechanical vibration, but the initiation of the signal corresponds accurately to a predetermined critical position of the movable member independently of the presence or absence of such vibration.

That and other advantages of the invention are accomplished by combining a primary sensing switch mechanism with improved response circuitry by which an output switch or power switch is controlled in a novel and effective manner. The output switch may be of relay type, or of any equivalent construction.

A full understanding of the invention, and of its further objects and advantages, will be had from the following description of an illustrative mechanism for carrying it into effect. The particulars of that description, and of the accompanying drawings which form a part of it, are intended only for illustration and not as a limitation upon the scope of the invention.

Figure 2:
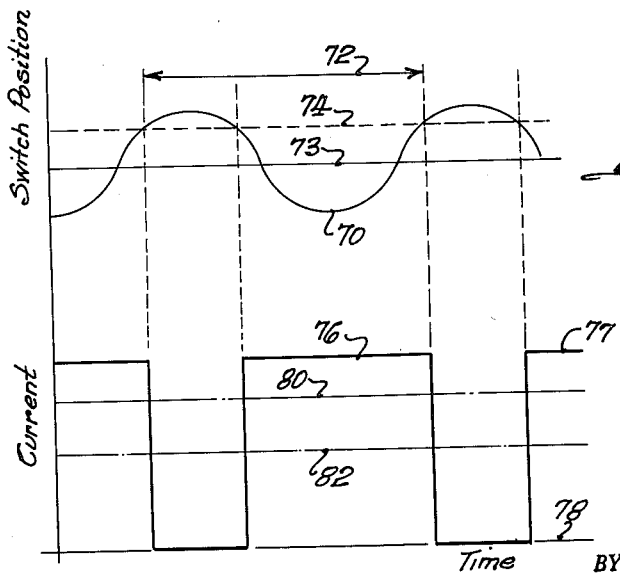

In the drawings:

FIG. 1 is a schematic drawing representing an illustrative embodiment of the invention; and FIG. 2 is a diagram, illustrating typical operation of the embodiment of FIG. 1.

In FIG. 1 an illustrative computing mechanism is represented schematically at 20, and comprises a balance lever 22 pivotally mounted at 24 on a rigid base frame 23. Rotary movement of lever 22 is preferably limited to a small range of travel, as by adjustable stop screws 26 and 27. The capsule 28 represents any desired type of input mechanism, by which a yielding force may be applied to lever 22 in response to one or more input variables. In the present instance, for example, capsule 28 may be evacuated, so that it responds to the variable atmospheric pressure acting upon its external surface. The resulting variable force developed by the capsule is transmitted to lever 22 by the pivoted rod 29. That force tends to swing lever 22 about pivot 24 in the clockwise direction as seen in the drawing. That force is opposed in the present embodiment by a uniform yielding force exerted by the coil spring 25, which tends to swing the lever in the counter-clockwise direction. The balance position of the lever is therefore determined by the ratio of the variable force exerted by capsule 28 to the uniform force exerted by spring 25. When that force ratio is less than some critical value, lever 22 tends to swing counterclockwise, engaging stop screw 26. When the force ratio exceeds that critical value, the lever tends to swing clockwise, toward stop screw 27. Those stop screws are adjusted to prevent extreme movements of lever 22 without interfering with the switch operation to be described.

In the present embodiment, that lever movement is sensed by the electrical switch 30. That switch comprises a fixed switch contact 32, mounted in insulated relation on frame 23, and a movable contact 34, mounted in insulated relation on lever 22 for movement therewith. One of those contacts, shown illustratively as movable contact 34, is spring mounted, so that it is yieldingly deflectable in response to relatively light pressure. The contact may, for example, consist of an elongated strip of resilient sheet metal mounted at one end, as shown at 35, and having a contact surface adjacent the other end. If the material of the strip is not suitable for forming an electrical contact, a small contact element of suitable material may be mounted on it in position to engage fixed contact 32. In accordance with the present invention, the resiliently mounted contact is designed, in accordance with known engineering principles, to have a natural frequency of oscillatory movement that is high compared to the range of vibration frequencies to which the mechanism will be subject during its contemplated use. For example, if the frame 23 is to be mounted in an aircraft where it is normally subject to vibrations which have frequencies predominantly in the range from about 50 to 1,000 cycles per second, for example, the spring contact 34 is preferably designed to have a natural frequency higher than 5000 cycles per second, say. The contact will then normally move substantially with lever 22, not only with respect to the average swinging movement of the lever about pivot 24, but also with respect to the vibratory movement that may be imposed upon the lever by virtue of the external vibration to which the entire device is subjected.

The output circuit system illustratively shown in FIG. 1 comprises an amplifying device 40, represented as a transistor of npn type, and an output or power relay 50. The transistor collector terminal is connected via the winding 52 of relay 50 to the positive terminal of a source of direct current power, represented as the battery 46. The negative terminal of battery 46 is connected to ground. The emitter terminal of transistor 40 is connected via the resistor 44 and line 45 to ground, completing a transistor output circuit through relay winding 52. The relay switch is shown as a normally closed switch, which is opened in response to winding energization. The switch is connected in series with an indicating or control device, represented schematically at 58, which may be of any conventional type.

The transistor base is connected to a suitable control circuit which is adapted for performing two distinct functions. In the first place, that control circuit shifts the transistor between cut-off and conductive conditions in response to the operation of switch 30. In addition, the control circuit provides adjustable limitation of the current that is carried by the transistor output circuit when in conductive condition. The transistor thus represents a variable resistance in series with relay winding 52, whereby a definite current is caused to flow during the periods of switch closure.

In the present illustrative circuit, the transistor base is connected via the line 48 to the brush of a potentiometer 49. The potentiometer winding is connected in series with the resistor 55 as a voltage divider across battery 46. A current limiting resistance 47 may be inserted in line 48. Adjustment of potentiometer 49 then controls the bias applied to the transistor base, providing convenient control of the normal current through relay winding 52. Initial adjustment of the potentiometer is typically such that the steady state current in the output circuit of the transistor, when conductive, is approximately twice that required to maintain relay 50 in actuated condition.

In the present embodiment, switch 30 is so connected that switch closure cuts off the transistor, whereas with the switch open the transistor is biased, as already described, for limited conduction. That is illustratively accomplished by connecting switch contact 34 via the line 56 to line 48, and by connecting switch contact 32 via the line 57 to the transistor emitter terminal. Switch closure then supplied effectively zero bias to the base-emitter circuit of the transistor, cutting off current flow in its output circuit.

In accordance with a further aspect of the invention, filter means are provided in the output circuit of transistor 40, adapted to smooth current pulses resulting from intermittent transistor operation at frequencies within the range of anticipated external vibrations. As shown, that filtering action is provided by the capacitor 60, which is connected in shunt to relay winding 52. The value of capacitor 60 is selected to give, with the relay winding and the effective resistance of transistor 40, a time constant that is long compared to the lowest anticipated period of vibration. For example, if the low frequency end of the range of anticipated vibrations is approximately 50 cycles per second, the time constant of the filter circuit is preferably of the order of one twentieth of a second or more.

Operation of the described system is typically as follows. In the absence of external vibration, the operation is straightforward. The critical value of the described ratio of the input forces to lever 22 may then be definitely defined as the value for which sensing switch 30 is just closed. When the force ratio is less than that critical value, sensing switch 30 is open and transistor 40 is biased for a limited conduction which is sufficient to hold relay 50 actuated positively and reliably. Output switch 54 is thereby normally held open, typically inactivating output device 58. As the force ratio increases, sensing switch 30 closes precisely as the ratio reaches its critical value, neglecting such factors as friction for clarity of discussion. Transistor 40 is thereby cut off, idling relay 50, and closing the output circuit at switch 54. Output device 58 is thereby activated to perform whatever indicating or control function is desired in response to the critical ratio of the input forces.

In the presence of appreciable impressed vibratory motion, lever 22 may be considered to oscillate about an equilibrium position with a frequency and amplitude corresponding to the impressed vibration. Switch contact 34 normally follows that oscillatory movement substantially fully. When the input force ratio is appreciably less than its critical value, defined above, switch 30 remains continuously open, idling output device 58 as in the case of zero vibration. As the input force ratio approaches its critical value, switch 30 begins to close intermittently in response to the extreme excursions of contact arm 34 in its vibratory movement with lever 22. The periods of switch closure are initially extremely short, but increase gradually as the average position of the movable switch contact approaches the fixed switch contact.

Typical relations are represented diagrammatically in FIG. 2, which is a schematic plot of certain variables as a function of time. The line 70 represents oscillatory movement of switch contact 36 in response to an impressed vibration. For clarity of illustration, that vibratory movement is taken as a simple sinusoidal movement with a definite period, represented at 72. However, the same considerations will be seen to apply to a more complex type of movement. The average position of contact 34 is represented by the straight line 73. The dashed line 74 represents the relative position of fixed contact 32 for some particular value of input force ratio that is slightly less than the critical value. Under that condition, switch 30 is closed during those periods when curve 70 extends above line 74, and is open during the remainder of each cycle of vibration. That switch closure intermittently cuts off the transistor, so that its output current may be represented by the solid line 76, which alternates between the level 77, fixed by the setting of potentiometer 49 in the manner already described, and the level 78, representing zero current. That transistor current of square wave form is smoothed by the action of filter 60, and the resulting average current through relay winding 52 may therefore be represented in somewhat idealized form by the straight line 80, the level of which corresponds to the average level of line 76.

As the force ratio approaches its critical value, the lines 73 and 74 in FIG. 2 move closer together, causing the periods of transistor cut-off to increase in length. The average current through the relay winding therefore decreases. That is represented in the diagram by downward movement of the line 80. When that line reaches some definite level, represented typically at 82, the current through the relay winding is no longer sufficient to maintain relay actuation. The relay then drops out, closing the output circuit at switch 54. An important feature of that action is the fact that it corresponds to a definite average position of balance lever 22, not to an extreme excursion of its vibratory movement.

I have discovered that with the described circuit arrangement, it is possible to adjust the action so that release of relay 50 occurs at the same average position of balance lever 22, regardless of whether impressed vibration is present or not. That desirable condition normally occurs when the bias of transistor 40 is so adjusted that the transistor current, during periods of conduction, is limited to a value approximately equal to twice the continuous current required to hold relay 50 actuated. The system is preferably so adjusted initially, and a further fine adjustment may be made, at potentiometer 49 or otherwise, to obtain the desired coincidence under actual conditions of vibration.

It will be understood, of course, that in a practical system, balance lever 22 is ordinarily counterbalanced and damped in known manner, by means not explicitly represented in the drawing, to make it as unresponsive as possible to impressed external vibrations. However, even the best available techniques for stabilizing the lever movement fall short of perfection. The present invention greatly improves the reliability and accuracy of practical systems; and may lead to appreciable economy by providing a required quality of performance with less elaborate counterbalancing means.

It will be evident to those skilled in the art that many changes may be made in the described system without departing from the proper scope of the invention, which is defined in the appended claims. For example, the amplifying element 40 may be arranged to conduct current in its output circuit in response to closure of switch 30, rather than in response to open condition of that switch. The action of relay switch 54 may also be inverted if desired. Adjustment of the magnitude of the current in the output circuit of device 40 may be adjusted in many different ways, the bias adjustment shown at 40 being merely illustrative. Voltage regulating means of known type may be provided in series with battery 46, and such means may be adjustable to vary the voltage supplied to the operating circuit through relay winding 52. Whereas computing mechanism 20, as shown, is responsive to a simple force ratio involving one uniform and one variable force, that structure is representative of a wide variety of known systems for receiving a plurality of input variables and controlling the movement of an output member, such as balance lever 22, in accordance with any desired functional relation of those variables.

I claim:

1. Output mechanism for a computing system that comprises a member that is movable through a critical position under input variable control, said member being subject to superposed vibratory movement; said output mechanism comprising electrical switch means actuable in response to movement of the member past said critical position, circuit means for producing a current of predetermined limited magnitude in response to switch actuation, filter means for averaging variations of said current that result from said vibratory movement of the member, output switching means actuable in response to the averaged current exceeding a predetermined magnitude, and means for adjustably controlling the limited magnitude of the first said current to cause actuation of the output switching means when the member position, averaged over its vibratory movement, substantially corresponds to said critical position.

2. Output mechanism for a computing system that comprises a member that is movable through a critical position under input variable control, said member being subject to superposed vibratory movement having a predetermined frequency range; said output mechanism comprising electrical switch means actuable intermittently in response to periodic movement of the member past said critical position at frequencies within said range, circuit means for producing an intermittent current of predetermined limited magnitude in response to said intermittent switch actuation, output switching means actuable in response to a substantially continuous control current of predetermined magnitude less than said limited magnitude, filter means for averaging said intermittent current and supplying the resulting substantially continuous current as control current to the output switching means, and means for adjustably varying the value of said limited current magnitude.

3. Output mechanism for a computing system that comprises a member that is movable through a critical position under input variable control, said member being subject to superposed vibratory movement having a predetermined frequency range; said output mechanism comprising electrical switch means actuable intermittently in response to periodic movement of the member past said critical position at frequencies within said range, amplifying means having an input circuit that includes said switch means and acting to produce an output current that responds intermittently to said intermittent switch actuation, means for adjustably varying the instantaneous value of said output current, means for averaging variations of the output current corresponding to frequencies within said frequency range, and output means actuable in response to the average current passing through a predetermined magnitude less than said instantaneous current value.

References Cited in the file of this patent
UNITED STATES PATENTS
2,530,749   Yardeny et al. _____ Nov. 21, 1950